(12) United States Patent
Sugimoto et al.

(10) Patent No.: US 8,628,111 B2
(45) Date of Patent: Jan. 14, 2014

(54) SIDE AIRBAG DEVICE

(75) Inventors: Shinichi Sugimoto, Tokyo (JP); Daisuke Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/513,795

(22) PCT Filed: Nov. 8, 2010

(86) PCT No.: PCT/JP2010/069804
§ 371 (c)(1),
(2), (4) Date: Jun. 4, 2012

(87) PCT Pub. No.: WO2011/068010
PCT Pub. Date: Jun. 9, 2011

(65) Prior Publication Data
US 2012/0248747 A1    Oct. 4, 2012

(30) Foreign Application Priority Data

Dec. 4, 2009  (JP) ................................. 2009-276594

(51) Int. Cl.
*B60R 21/16*    (2006.01)

(52) U.S. Cl.
USPC ...... 280/729; 280/730.2; 280/739; 280/743.1

(58) Field of Classification Search
USPC ............................. 280/729, 730.2, 739, 743.1
See application file for complete search history.

(56) References Cited

U.S. PATENT DOCUMENTS

| | | | | |
|---|---|---|---|---|
| 6,976,702 B2* | 12/2005 | Yokota et al. | ............... | 280/730.2 |
| 7,347,444 B2* | 3/2008 | Wheelwright | ................ | 280/729 |
| 7,431,329 B2* | 10/2008 | Taguchi et al. | ................ | 280/729 |
| 7,607,682 B2* | 10/2009 | Kurimoto et al. | ............. | 280/729 |
| 7,644,950 B2* | 1/2010 | Kloss et al. | .................... | 280/740 |
| 8,056,923 B2* | 11/2011 | Shimono | .................... | 280/730.2 |
| 8,266,114 B2* | 9/2012 | Mace et al. | ................... | 707/692 |
| 8,322,747 B2* | 12/2012 | Shankar | ........................ | 280/729 |
| 8,328,227 B2* | 12/2012 | Shimono | ....................... | 280/729 |
| 8,356,835 B2* | 1/2013 | Yamamoto | ................. | 280/730.2 |

FOREIGN PATENT DOCUMENTS

| JP | H11-091493 A | 4/1999 |
|---|---|---|
| JP | 2003-034214 A | 2/2003 |
| JP | 2004-196162 A | 7/2004 |

(Continued)

OTHER PUBLICATIONS

International Search Report from the International Bureau of WIPO for International Application No. PCT/JP2010/069804 dated Feb. 8, 2011 (2 pages) and an English translation of the same (2 pages).

*Primary Examiner* — Toan To
(74) *Attorney, Agent, or Firm* — Fitch, Even, Tabin & Flannery, LLP

(57) ABSTRACT

Provided is a side airbag device such that locally high stress is prevented from being generated at the sewn portion between panels by high temperature and pressure gas. An inner panel is folded in half, and the upper edges thereof are sewn together by a seam so as to form an inner bag. This inner bag is placed on an outer panel, the outer panel is folded in half, and the periphery thereof is sewn by a seam. An inflator equipped with a distributor is inserted into the inner bag through openings and, and a gas jetting portion is disposed in the immediate vicinity of a communication opening.

4 Claims, 16 Drawing Sheets

(56) References Cited

FOREIGN PATENT DOCUMENTS

| | | |
|---|---|---|
| JP | 2005-238890 A | 9/2005 |
| JP | 2007-308122 A | 11/2007 |
| JP | 2008-018925 A | 1/2008 |
| JP | 2009-166794 A | 7/2009 |
| WO | 2004/065179 A1 | 8/2004 |

* cited by examiner

SIDE AIRBAG DEVICE

CROSS-REFERENCE TO RELATED APPLICATIONS

This application is a U.S. national phase application filed under 35 U.S.C. §371 of International Application PCT/JP2010/069804, filed on Nov. 8, 2010, designating the United States, which claims priority from Japanese Application 2009-276594, filed Dec. 4, 2009, which are hereby incorporated herein by reference in their entirety.

FIELD OF THE INVENTION

The present invention relates to a side airbag device for restraining an occupant of an automobile or the like during a side collision, overturn, or the like, and more specifically, it relates to a side airbag device having an airbag such that an inner bag is disposed within an outer bag.

BACKGROUND OF THE INVENTION

A side airbag device, as is well known, during a side collision, overturn, or the like of an automobile, inflates a side airbag (hereinafter also simply referred to as airbag) with a gas generator, and receives an occupant's body with this inflated airbag.

It is known to inflate the lower part of a side airbag, with which the waist portion of an occupant comes into contact, to an inner pressure higher than that of the upper part thereof (for example, Japanese Unexamined Patent Application Publication No. 2003-34214, Japanese Unexamined Patent Application Publication No. 2005-238890 and Japanese Unexamined Patent Application Publication No. 11-91493).

It is known to divide the inside of a side airbag into an upper part and a lower part as shown in FIGS. 17 and 18. A side airbag 1A of FIG. 17 is made by sewing the peripheries of an occupant-side panel 2 and a vehicle-body-side panel 3 with sewing thread 4. The inside of the side airbag 1A is divided into an upper chamber 6 and a lower chamber 7 by sewing the middles in the vertical direction of the panels 2 and 3 with sewing thread 5.

A side airbag 1B of FIG. 18 is made by sewing the peripheries of an occupant-side panel 2 and a vehicle-body-side panel 3 with sewing thread 4. The inside of the side airbag 1B is divided into an upper chamber 6 and a lower chamber 7 by providing a partition panel 8 in the middles in the vertical direction of the panels 2 and 3. The partition panel 8 is sewn to the panels 2 and 3 with sewing thread 9.

In the above-described side airbags 1A and 1B, an inflator (not shown in FIGS. 17 and 18) is disposed such that gas from the inflator is supplied first to the lower chamber 7 to start the inflation of the lower chamber 7, and then gas is supplied from the lower chamber 7 to the inside of the upper chamber 6 to inflate the upper chamber 6.

In such conventional side airbags 1A and 1B, during inflation, locally high stress is generated in the vicinities of the sewing threads 5 and 9 of the panels 2, 3, and 8 by the pressure of high temperature and pressure gas acting on them. Thus, it is necessary to reinforce the panels 2, 3, and 8 in the vicinity of the sewing threads 5 and 9 or to provide reinforcing means for enhancing the heat resistance, the manufacture of the side airbags takes time, and the manufacturing cost increases.

SUMMARY OF THE INVENTION

It is an object of the present invention to solve the above-described problem and to provide a side airbag device in which locally high stress is prevented from being generated at the sewn portion between panels by high temperature and pressure gas.

A side airbag device according to a first aspect includes an airbag, and an inflator for inflating the airbag, the airbag including an outer bag and an inner bag inflating within the outer bag, the inner bag being provided with a communication opening connecting the inside of the outer bag and the inside of the inner bag, wherein the inflator is disposed in the airbag, and at least a gas jetting portion of the inflator is disposed in the inner bag in the vicinity of the communication opening.

A side airbag device according to a second aspect is the side airbag device according to the first aspect, wherein at least one of the outer bag and the inner bag is made by folding a panel in half such that the peripheries are superimposed, and the superimposed peripheries are sewn together, and wherein the communication opening is disposed in the vicinity of the folded edge of the panel.

A side airbag device according to a third aspect is the side airbag device according to the first aspect, wherein the outer bag and the inner bag are each made by folding a panel in half such that the peripheries are superimposed, and the superimposed peripheries are sewn together, wherein the folded edge of the inner bag is disposed along the folded edge of the outer bag, and wherein the communication opening is disposed in the vicinity of the folded edge of the inner bag.

A side airbag device according to a fourth aspect is the side airbag device according to the third aspect, wherein the inflator is rod-like and is disposed along the folded edge of the inner bag, wherein the gas jetting portion is provided at one end in the longitudinal direction of the inflator, and wherein a distributor for distributing gas from the gas jetting portion to the inside of the inner bag and the inside of the outer bag is provided at the one end of the inflator.

A side airbag device according to a fifth aspect is the side airbag device according to the fourth aspect, wherein the inner bag is disposed in the lower part of the inside of the outer bag, and the folded edge is disposed on a vertical edge of the airbag, and wherein a vertical edge other than the folded edge, and the lower edge of the inner bag are sewn together with the periphery of the outer bag.

The airbag of the side airbag device of the present invention is an airbag such that an inner bag is disposed within an outer bag. A communication opening connecting the inside of the outer bag and the inside of the inner bag is provided in the inner bag. A gas jetting portion of an inflator is disposed in the inner bag in the vicinity of the communication opening. For this reason, high temperature and pressure gas from the inflator does not acts directly on part of the outer bag in the vicinity of the inflator gas jetting portion. Thus, the need to locally reinforce the part of the outer bag in the vicinity of the inflator gas jetting portion is eliminated. As a result, the time and cost of manufacture of the side airbag are reduced.

The outer bag and the inner bag may be made by superimposing two panels and sewing the entire periphery to form a bag shape, or may be made by folding a panel in half, superimposing a half and the other half, and sewing the superimposed peripheries. There is no sewing thread for sewing on the folded edge of an outer bag or an inner bag made by folding a panel in half. For this reason, localized stress due to the gas pressure acting on a seam is not generated in the folded edge.

For this reason, in the second aspect, in the case where the communication opening is disposed in the vicinity of the folded edge of the inner bag so that the gas jetting portion of the inflator acts on the folded edge, the folded edge of the inner bag need not be specially reinforced, and the folded edge sufficiently withstands high temperature and pressure gas. In particular, when the folded edge of the inner bag is disposed along the folded edge of the outer bag as in the third aspect, the folded edges of both the inner bag and the outer bag need not be specially reinforced, and the folded edges sufficiently withstand high temperature and pressure gas.

In the side airbag device of the fourth aspect, when the inflator is activated, gas from the gas jetting portion of the inflator is supplied to the outer bag and the inner bag almost at the same time, both the outer bag and the inner bag start to inflate almost at the same time, and the entire side airbag completes inflation early.

Since, in the side airbag device of the fourth embodiment, the inflator is disposed along the folded edge of the inner bag, both the inner bag and the outer bag can be attached together with the inflator to a vehicle member such as a seat using an attaching member (for example, a stud bolt) of the inflator.

In the case where the inner bag is disposed in the lower part of the inside of the outer bag as in the fifth embodiment, by making the gas pressure in the inner bag during inflation higher than the gas pressure in the outer bag, the waist portion of an occupant can be restrained with this inner bag having a high inner pressure.

When vertical edges other than the folded edges, and the lower edges of the outer bag and the inner bag are sewn together, and the upper edge of the inner bag is not sewn to the outer bag, sewing threads 5 and 9 such as those in FIGS. 17 and 18 do not exist in the middle part in the vertical direction of the outer bag. Thus, locally high stress is prevented from being generated at the seam part in the middle part in the vertical direction of the outer bag.

BRIEF DESCRIPTION OF THE DRAWINGS

FIG. 20b is a sectional view taken along line XXb-XXb of FIG. 20a.

FIG. 21b is a sectional view taken along line XXIb-XXIb of FIG. 21a.

FIG. 22b is a sectional view taken along line XXIIb-XXIIb of FIG. 22a.

FIG. 23b is a sectional view taken along line XXIIIb-XXIIIb of FIG. 23a.

FIG. 24b is a sectional view taken along line XXIVb-XXIVb of FIG. 24a.

DETAILED DESCRIPTION OF THE PREFERRED EMBODIMENTS

Figure 16:
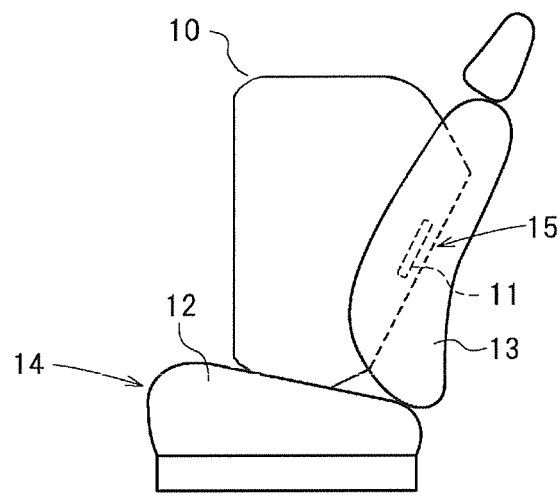
FIG. 16 is a side view of an automotive seat equipped with a side airbag device according to an embodiment.
Figure 17:
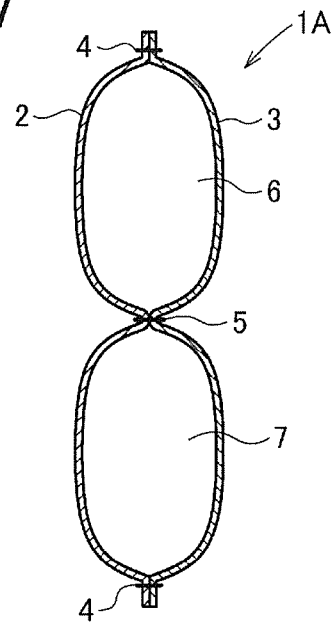
FIG. 17 is a vertical sectional view of a conventional side airbag.
Figure 18:
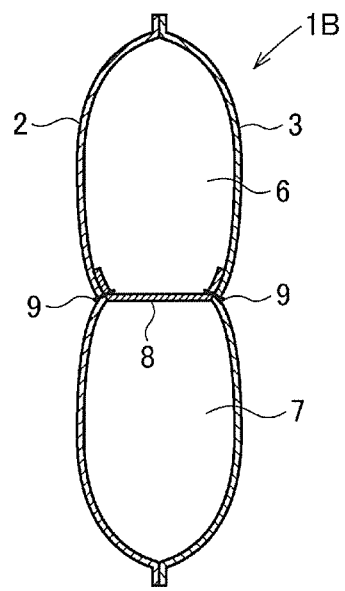
FIG. 18 is a vertical sectional view of another conventional side airbag.

As shown in FIG. 16, a seat 14 having a seat cushion 12 and a seat back 13 is installed in a vehicle interior. A side airbag device 15 is installed so as to inflate a side airbag 10 between an occupant sitting in this seat 14 and a door or a pillar beside the seat 14. In this embodiment, the side airbag device 15 is installed in the side of the seat back 13, and the side airbag 10 can be inflated by gas from an inflator 11 forward from the side edge of the seat back 13.

Figure 1:
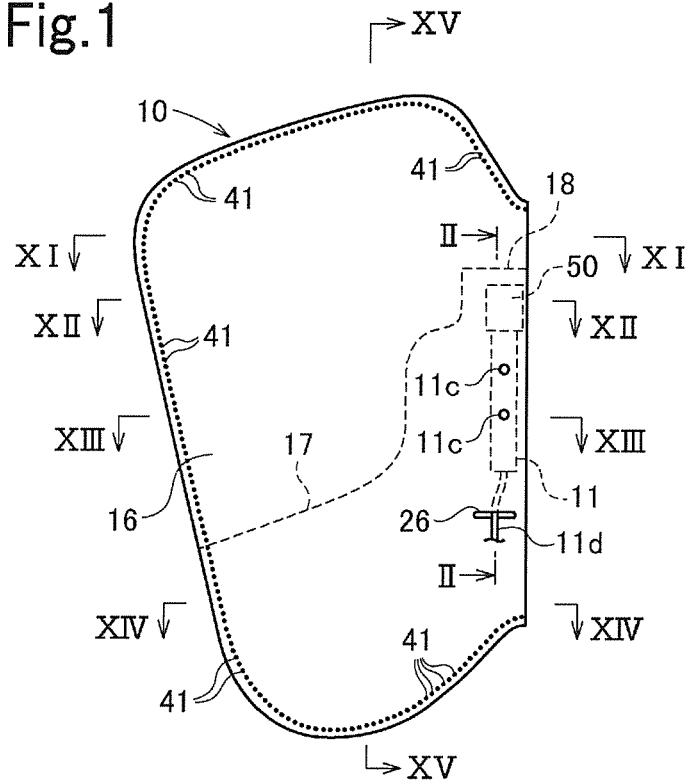
FIG. 1 is an elevation of a side airbag according to an embodiment.

FIG. 1 is an elevation of this side airbag 10 as viewed from the vehicle interior side. This side airbag 10 has an outer bag 16 and an inner bag 17 within the outer bag 16. With reference to FIG. 5 to FIG. 10, how to sew the side airbag 10 will be described below.

Figure 5:
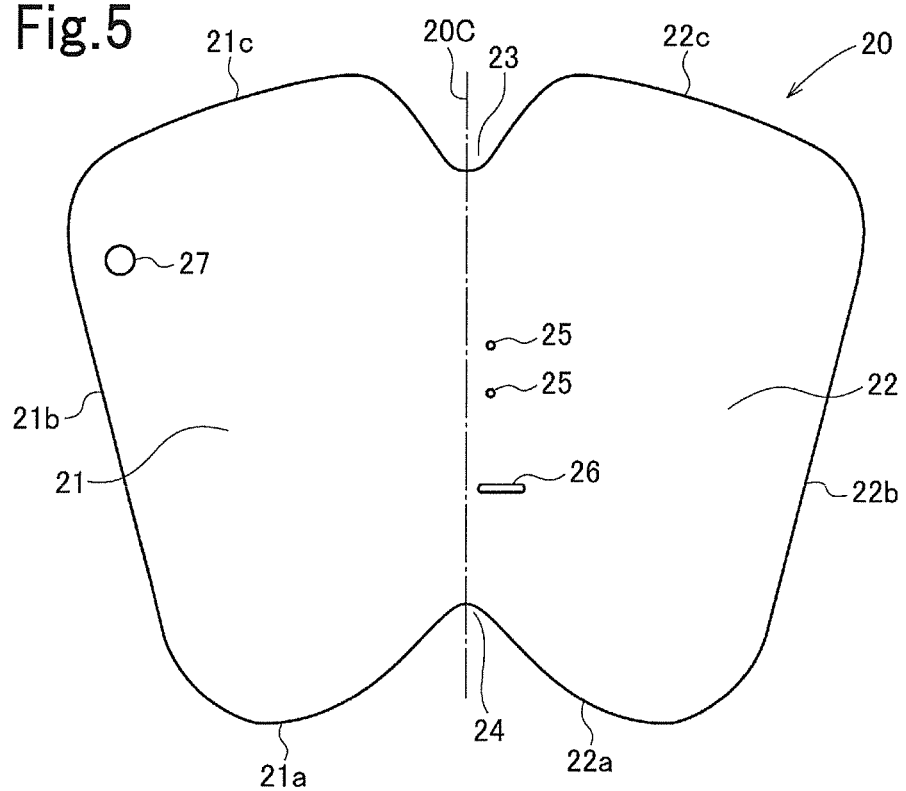
FIG. 5 is a development view of a panel of an outer bag.
Figure 6:
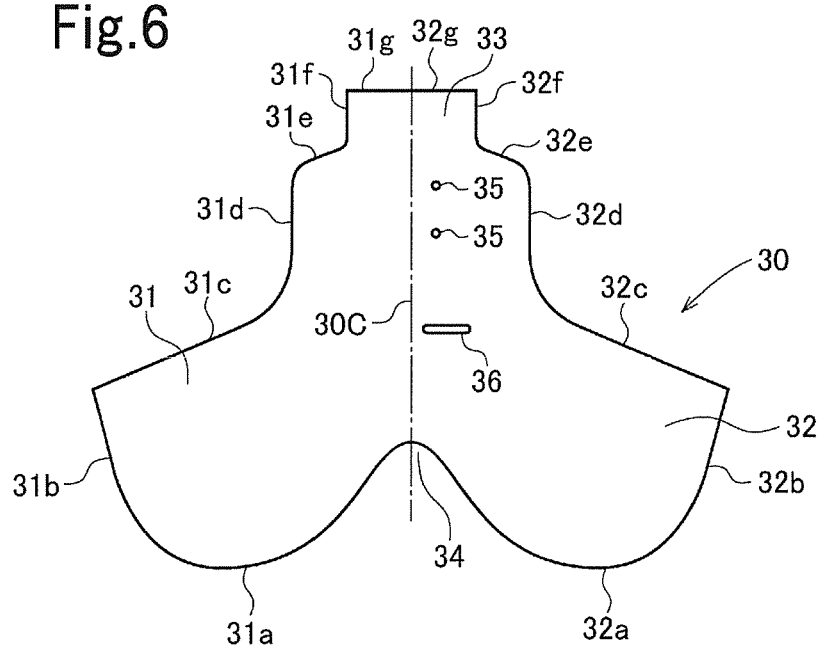
FIG. 6 is a development view of a panel of an inner bag.

The outer bag 16 is made by folding an outer bag panel (hereinafter also referred to as outer panel) 20 shown in FIG. 5 in half and sewing the periphery. The inner bag 17 is made by folding an inner bag panel (hereinafter also referred to as inner panel) 30 shown in FIG. 6 in half and sewing.

The outer panel 20 has a left section 21 and a right section 22. On the upper edge and the lower edge, between the left section 21 and the right section 22, recesses 23 and 24 are formed.

The left section 21 and the right section 22 have generally rectangular shapes having lower edges 21a and 22a, vertical edges 21b and 22b, and upper edges 21c and 22c, and is folded along the center line 20C extending between the left section 21 and the right section 22. The outer shapes of the left section 21 and the right section 22 are bilaterally symmetric with respect to the center line 20C. In the right section 22, in the vicinity of the center line 20C, small holes 25 for passing bolts of the inflator 11, and a slit-like opening 26 for inserting the inflator 11 into the side airbag 10 and passing a harness of the inflator 11 are provided. In the left section 21, in the upper part of the vicinity of the vertical edge 21b, a vent hole 27 is provided.

The inner panel 30 has a left section 31 and a right section 32. In the middle of the upper edge of the inner panel 30, a protrusion 33 extending upward is formed so as to straddle the left section 31 and the right section 32. On the lower edge of the inner panel 30, between the left section 31 and the right section 32, a recess 34 is formed.

The left section 31 and the right section 32 have lower edges 31a and 32a, first vertical edges 31b and 32b continuous with the lower edges 31a and 32a, first upper edges 31c and 32c continuous with the first vertical edges 31b and 32b and extending toward the center line 30C, second vertical edges 31*d* and 32*d* continuous with the center line 30C sides of the first upper edges 31*c* and 32*c* and extending upward, second upper edges 31*e* and 32*e* continuous with the upper ends of the second vertical edges 31*d* and 32*d* and extending toward the center line 30C, third vertical edges 31*f* and 32*f* continuous with the center line 30C sides of the second upper edges 31*e* and 32*e* and extending upward, and third upper edges 31*g* and 32*g* continuous with the upper ends of the third vertical edges 31*f* and 32*f* and extending toward the center line 30C. The third upper edges 31*g* and 32*g* are continuous with each other so as to form a straight line, and are perpendicular to the center line 30C. However, the third upper edges 31*g* and 32*g* may intersect so as not to form a straight line but to be convex or concave upward.

The outer shapes of the left section 31 and the right section 32 are bilaterally symmetric with respect to the center line 30C. In the right section 32, small holes 35 for passing bolts of the inflator 11, and a slit-like opening 36 for inserting the inflator 11 into the side airbag 10 and passing the harness of the inflator 11 are provided.

The lower edges 21*a* and 22*a* of the outer panel 20 and the lower edges 31*a* and 32*a* of the inner panel 30 have the same shapes and sizes so as to be exactly superimposed. The lower parts of the vertical edges 21*b* and 22*b* of the outer panel 20 and the first vertical edges 31*b* and 32*b* of the inner panel 30 also have the same shapes and sizes so as to be exactly superimposed.

The length of the outer panel 20 in the vertical direction along the center line 20C is larger than the length of the inner panel 30 in the vertical direction along the center line 30C. In a state where the lower edges 21*a*, 22*a*, 31*a*, and 32*a* are superimposed, the small holes 25 and 35 are disposed at positions such that they are superimposed on each other. As for the openings 26 and 36, the opening 26 is disposed below the opening 36, that is, at a position closer to the lower edges 22*a* and 32*a* than the opening 36.

Figure 7:
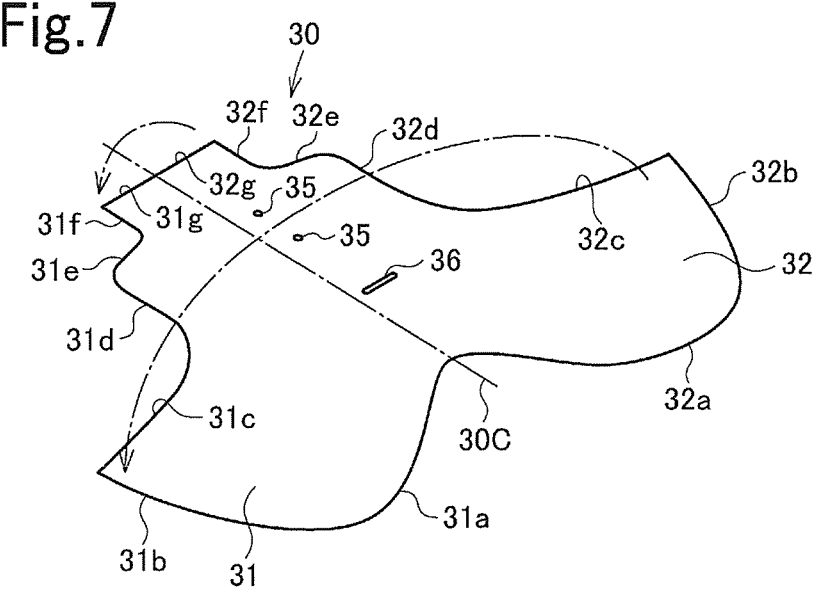
FIG. 7 is a perspective view showing how to fold the panel of an inner bag.
Figure 8:
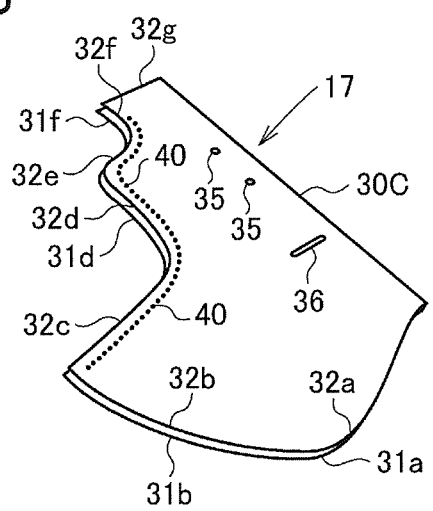
FIG. 8 is a perspective view of an inner bag.

This inner panel 30 is folded in half as shown in FIG. 7 along the center line 30C, and the left section 31 and the right section 32 are superimposed. Then, as shown in FIG. 8, the first upper edges 31*c* and 32*c*, the second vertical edges 31*d* and 32*d*, the second upper edges 31*e* and 32*e*, and the third vertical edges 31*f* and 32*f* are sewn together with sewing thread. Reference sign 40 denotes this seam. The seam 40 extends partway along the third vertical edges 31*f* and 32*f* in the vertical direction, and the seam 40 does not reach the uppermost part.

In FIG. 8, the lower edges 31*a* and 32*a*, the first vertical edges 31*b* and 32*b*, and the third upper edges 31*g* and 32*g* are not sewn together. The third upper edges 31*g* and 32*g* are not finally sewn together, and this part forms a communication opening 18 (FIGS. 1, 2, 10 to 12) that connects the inside of the outer bag 16 and the inside of the inner bag 17.

Figure 9:
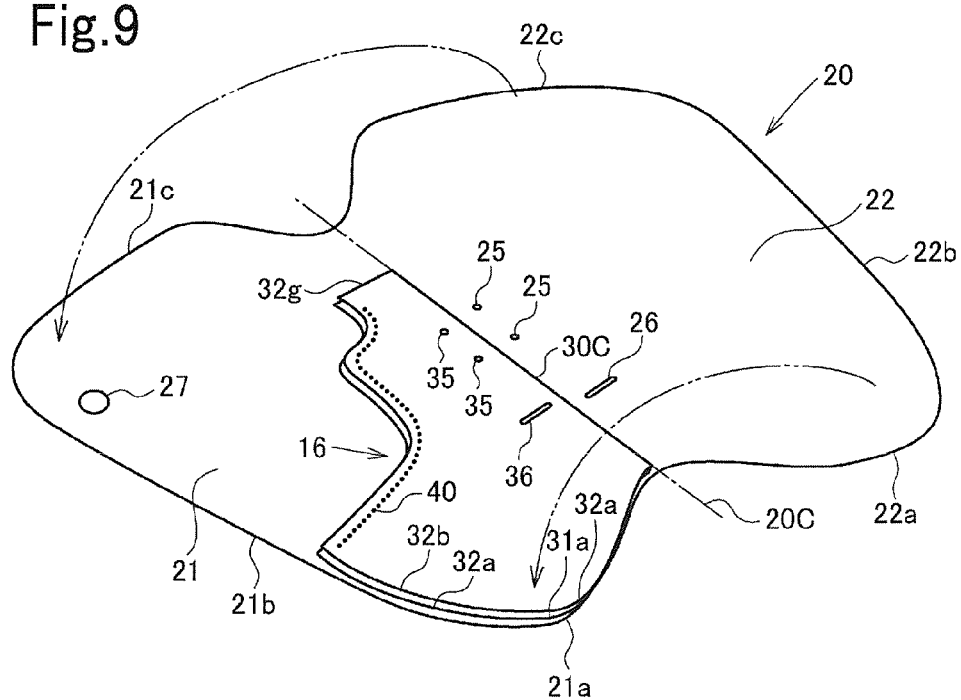
FIG. 9 is a perspective view showing how to fold the panel of an outer bag.

Next, the inner bag 17 sewn in this manner and formed of the inner panel 30 is placed on the outer panel 20 as shown in FIG. 9 such that the lower edges 31*a* and 32*a* and the first vertical edges 31*b* and 32*b* of the inner bag 17 are superimposed on the lower edge 21*a* and the vertical edge 21*b* of the left section 21 of the outer panel 20. At this time, the inner panel center line 30C that is the folded edge of the inner bag 17 is superimposed on the center line 20C of the outer panel 20.

Figure 10:
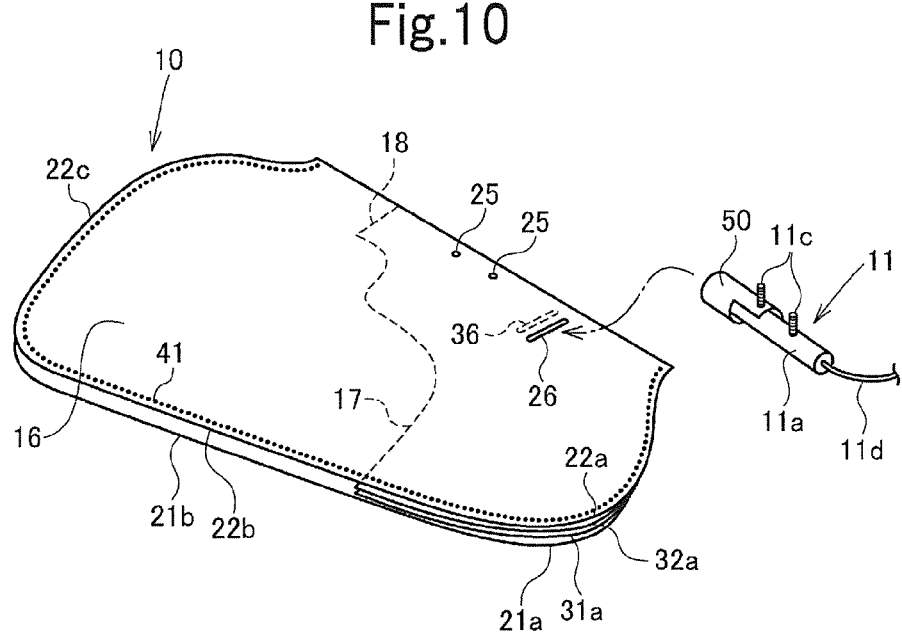
FIG. 10 is a perspective view showing how to insert the inflator into the airbag.
Figure 11:
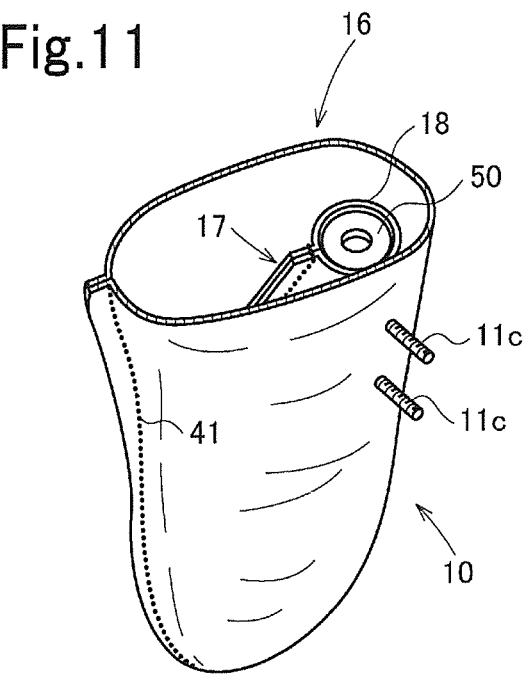
FIG. 11 is a sectional view taken along line XI-XI of FIG. 1.
Figure 12:
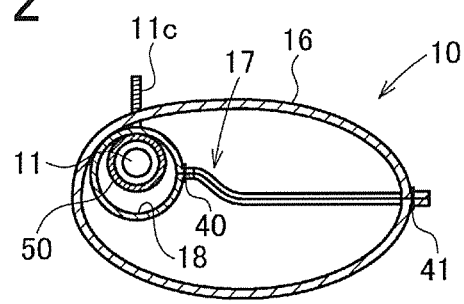
FIG. 12 is a sectional view taken along line XII-XII of FIG. 1.
Figure 13:
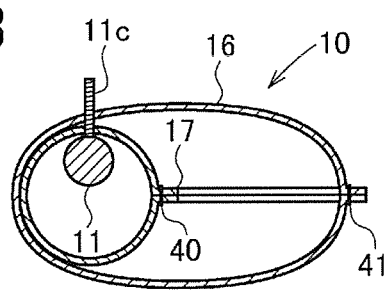
FIG. 13 is a sectional view taken along line XIII-XIII of FIG. 1.
Figure 14:
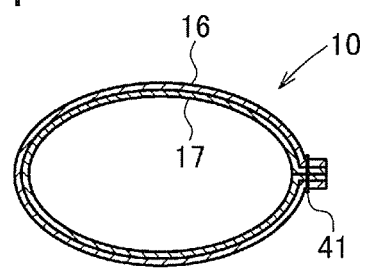
FIG. 14 is a sectional view taken along line XIV-XIV of FIG. 1.
Figure 15:
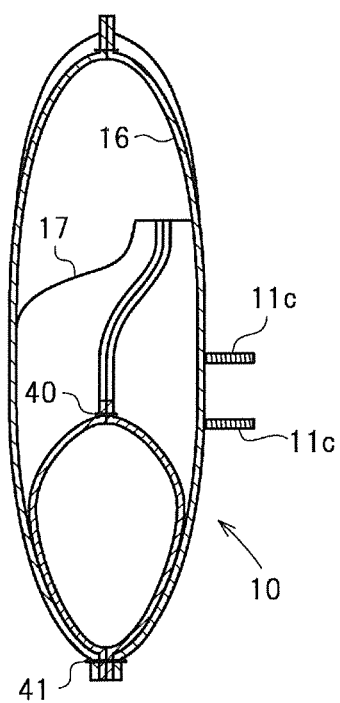
FIG. 15 is a sectional view taken along line XV-XV of FIG. 1.

Next, this outer panel 20 is folded in half along the center line 20C, and the right section 22 is superimposed on the left section 21. Then, as shown in FIG. 10, the lower edges 21*a* and 22*a*, the vertical edges 21*b* and 22*b*, and the upper edges 21*c* and 22*c* are sewn together with sewing thread. Reference sign 41 denotes this seam.

At the time of this sewing, the lower edges 31*a* and 32*a* and the first vertical edges 31*b* and 32*b* of the inner bag 17 are also sewn together by the seam 41. Thus, the side airbag 10 is completed.

Next, through the openings 26 and 36, the inflator 11 is inserted into the inner bag 17 of this side airbag 10.

As shown in FIG. 1 to FIG. 4, the inflator 11 has a cylindrical rod-like main body portion 11*a*, a gas jetting portion 11*b* protruding from one end face of the main body portion 11*a*, and two stud bolts 11*c* provided so as to protrude from the side peripheral surface of the main body portion 11*a* in a radial direction. The gas jetting portion 11*b* is smaller in diameter than the main body portion 11*a*, and a plurality of gas jetting ports are provided in the outer peripheral surface thereof.

Figure 3:
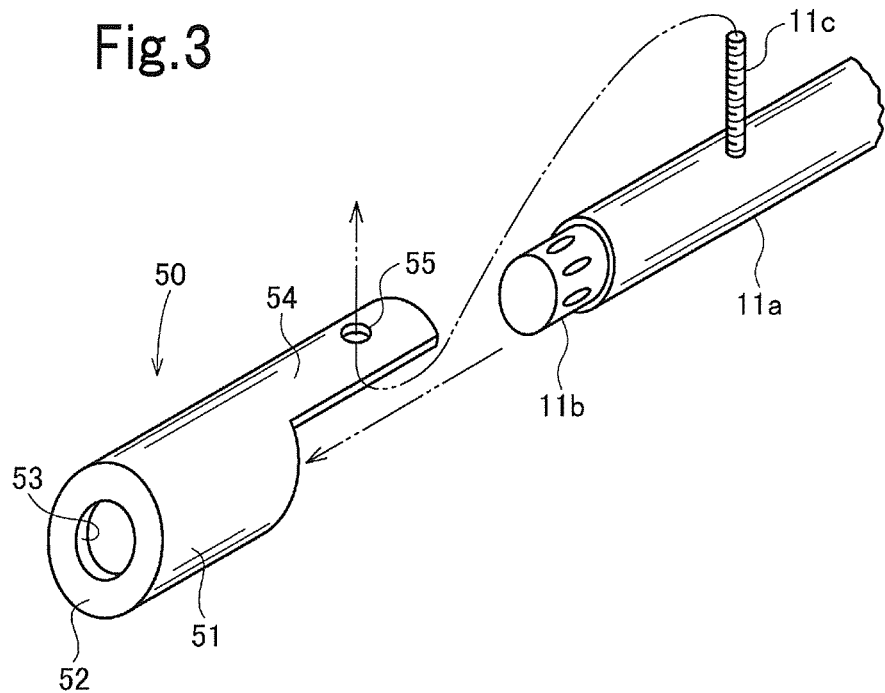
FIG. 3 is a perspective view showing an inflator and a distributor.
Figure 4:
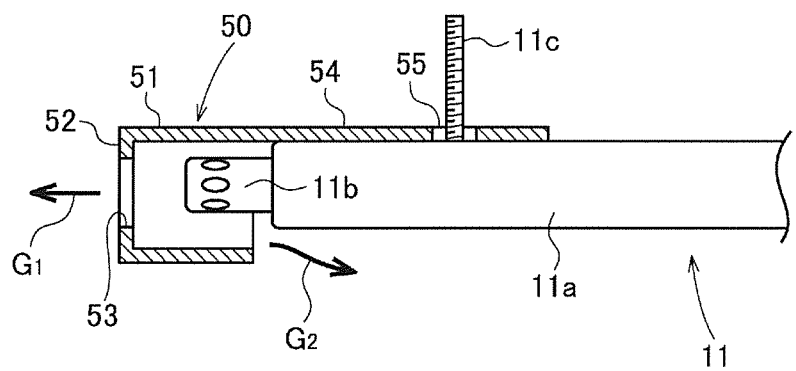
FIG. 4 is a sectional view showing the inflator to which the distributor is attached.

A distributor 50 is attached to this inflator 11. This distributor 50 has a hollow cylinder portion 51, an inward flange-like portion 52 provided at one end face of the hollow cylinder portion 51, a gas discharge hole 53 formed inside the flange-like portion 52, a tongue-like extending portion 54 extending from the other end of the hollow cylinder portion 51 and flush with the peripheral surface of the hollow cylinder portion 51, and a small hole 55 that is provided in the extending portion 54 and into which the stud bolt (hereinafter simply referred to as bolt) 11*c* is inserted. As shown in FIGS. 3 and 4, the gas jetting portion 11*b* of the inflator 11 is inserted into the hollow cylinder portion 51, and the bolt 11*c* is inserted into the small hole 55.

The inflator 11 to which the distributor 50 is attached as shown in FIG. 4 is inserted, as shown in FIG. 10, into the inner bag 17 through the opening 26 of the outer bag 16 and the opening 36 of the inner bag 17. The harness 11*d* of the inflator 11 is pulled out of the side airbag 10 through the openings 26 and 36. The distributor 50 is disposed, as shown in FIG. 2, in the immediate vicinity of the communication opening 18 in the inner bag 17.

Figure 2:
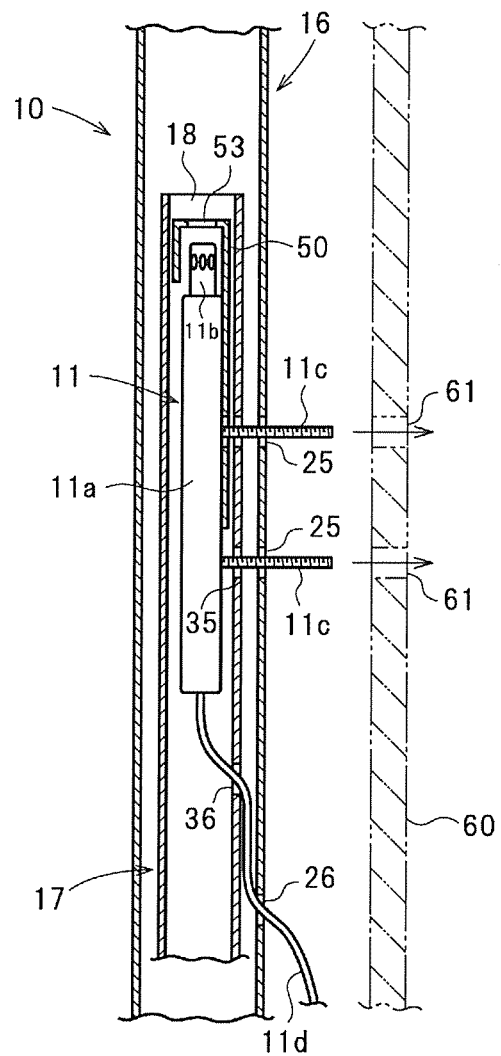
FIG. 2 is a sectional view taken along line II-II of FIG. 1.

As shown in FIG. 2, the bolts 11*c* of the inflator 11 are protruded through the small holes 35 and 25 of the inner bag 17 and the outer bag 16 outside the side airbag 10.

The main body portion 11*a* of the inflator 11 extends along the folded edges (center lines) 20C and 30C, and the distributor 50 is located in the immediate vicinity of the communication opening 18 in the inner bag 17.

By passing these bolts 11*c* through bolt holes 61 of a side airbag attaching member 60 (FIG. 2) such as a casing of the side airbag device or a seat back frame, and tightening nuts (not shown) on the bolts 11*c*, 11*c*, the side airbag 10 and the inflator 11 are fixed to the attaching member 60.

This side airbag 10 is folded into a predetermined shape, for example, as shown in FIG. 20 to FIG. 24 described later, and is contained in the casing of the side airbag device or a side airbag containing portion of the seat back 13, and a cover is attached to the side airbag 10. Thus, a seat 14 equipped with a side airbag device 15 is formed.

If a vehicle equipped with the side airbag device 15 configured as above is subjected to a side collision or the like, the inflator 11 generates gas and the side airbag 10 is inflated as shown in FIG. 16. This inflated side airbag 10 restrains an occupant, and the gas within the side airbag 10 is discharged through the vent hole 27, and the impact is absorbed.

In this embodiment, when the inflator 11 generates gas, half of the gas from the gas jetting portion 11*b* is supplied immediately to the inside of the outer bag 16 through the gas discharge port 53 and the communication opening 18 as shown by arrow $G_1$ of FIG. 4, and the other half of the gas flows from the distributor hollow cylinder portion 51 in the opposite direction as shown by arrow $G_2$ and is supplied immediately to the inside of the inner bag 17. For this reason, when the inflator 11 is activated, the outer bag 16 and the inner bag 17 are inflated almost at the same time. It is preferable to make the gas pressure in the inner bag 17 at the time of completion of inflation higher than the gas pressure in the outer bag 16 at the time of completion of inflation by selecting the volume of the inside of the inner bag 17 and the gas distribution property of the distributor 50. The inner bag 17 inflated to high inner pressure restrains the waist portion of the occupant.

In this embodiment, the gas jetting portion 11b of the inflator 11 is disposed in the vicinity of the communication opening 18 in the inner bag 17, and the vicinity of the communication opening 18 of the inner bag 17 is not sewn to the outer bag 16. There is no seam on the folded edge 20C of the outer bag 16. Thus, the outer bag 16 has no seam in the vicinity of the communication opening 18.

Since, as described above, the outer bag 16 does not have a seam on which high temperature and pressure gas jetted from the gas jetting portion 11b of the inflator 11 acts directly, it is not necessary to reinforce the vicinity of such a seam of the outer bag 16 so that it withstands high temperature and pressure gas. For this reason, the manufacture of the side airbag 10 is facilitated.

There is no seam on the folded edge 20C of the inner bag 17, either. There is no gas leak from this folded edge. If the gas within the inner bag 17 leaks slightly through the seam 40, this gas remains in the outer bag 16.

In this embodiment, gas from the inflator 11 is distributed by the distributor 50 and is supplied to the insides of the outer bag 16 and the inner bag 17 almost at the same time, and thus the outer bag 16 and the inner bag 17 are inflated almost at the same time. For this reason, compared to first inflating the inner bag and then inflating the outer bag with gas flowing out of the inner bag as in conventional side airbags, the time required to complete the inflation of the entire side airbag is reduced.

Since, in this embodiment, the lower edges 31a and 32a and the first vertical edges 31b and 32b of the inner bag 17 are sewn together with the lower edges 21a and 21b and the vertical edges 21b and 22b of the outer bag 16, sewing is easy.

Figure 19:
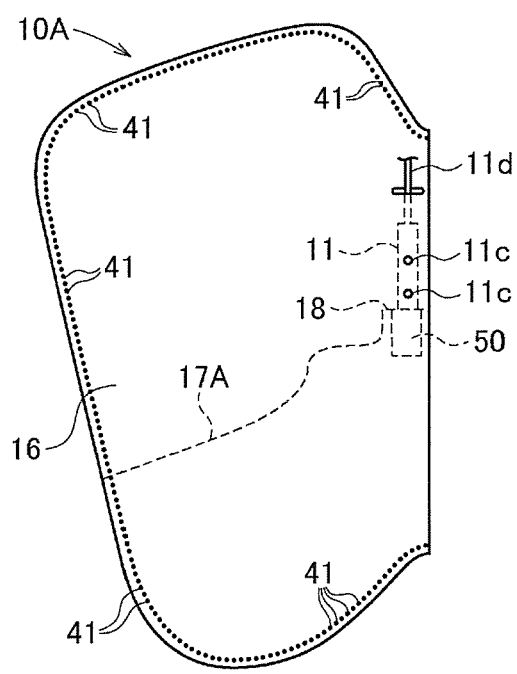
FIG. 19 is an elevation of a side airbag according to another embodiment.

In the above-described embodiment, the main body portion 11a of the inflator 11 is disposed in the inner bag 17. However, like the side airbag 10A of FIG. 19, the main body portion 11a of the inflator 11 may be disposed in the outer bag 16, and the gas jetting portion 11b may be inserted into the vicinity of the communication opening 18 in the inner bag 17.

Next, with reference to FIG. 20a to FIG. 24b, an example of how to fold the side airbag 10 will be described. However, how to fold the side airbag of the present invention is not limited to this. FIGS. 20a, 21a, 22a, 23a, and 24a are plan views of the side airbag placed on a folding workbench. FIGS. 20b, 21b, 22b, 23b, and 24b are sectional views taken along lines XXb-XXb, XXIb-XXIb, XXIIb-XXIIb, XXIIIb-XXIIIb, and XXIVb-XXIVb of FIGS. 20a, 21a, 22a, 23a, and 24a. In FIGS. 21a and 21b and FIGS. 22a and 22b, the inflator 11 are not shown.

Figure 20A:
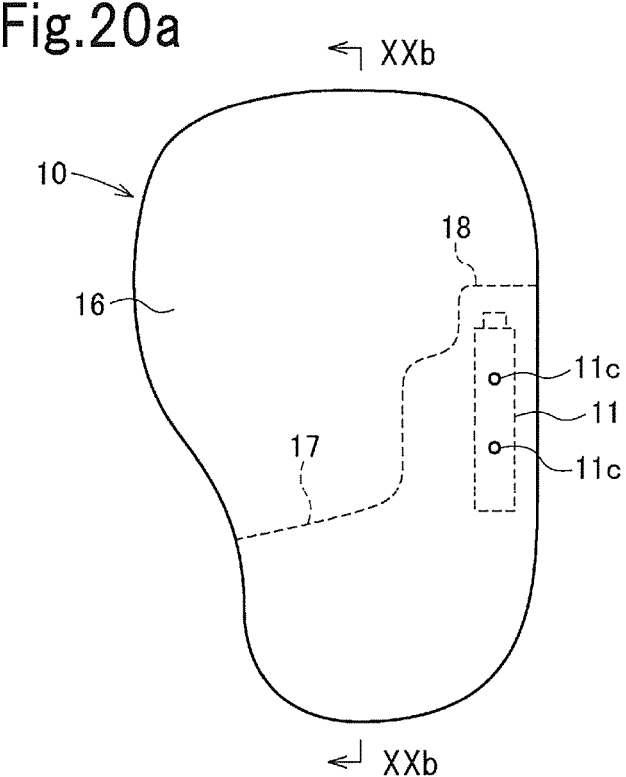
FIG. 20a includes a plan view and a sectional view showing how to fold a side airbag.
Figure 20B:
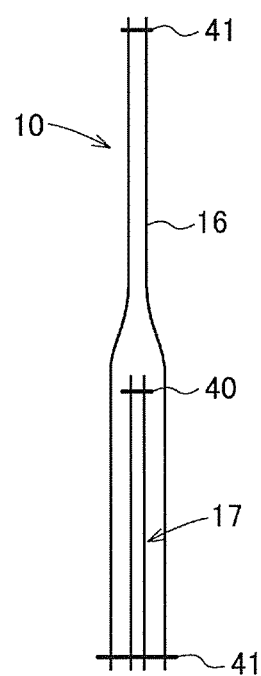
Figure 21A:
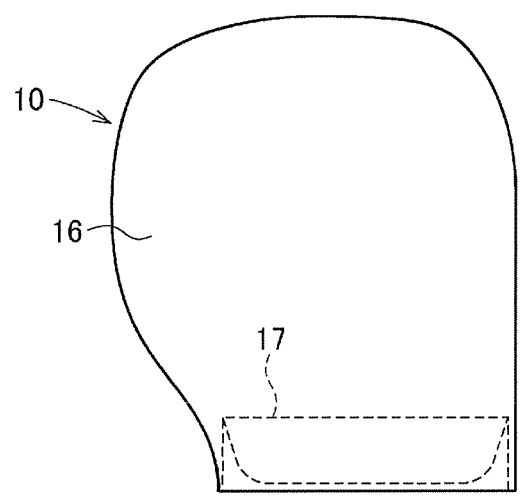
FIG. 21a is a plan view showing how to fold a side airbag.
Figure 21B:
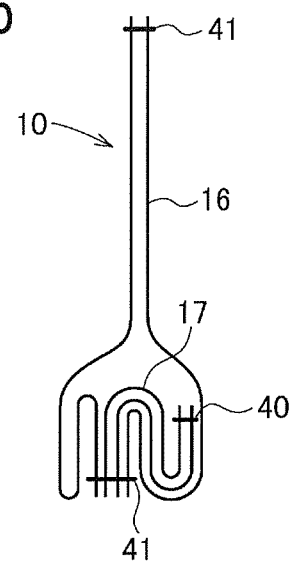
Figure 22A:
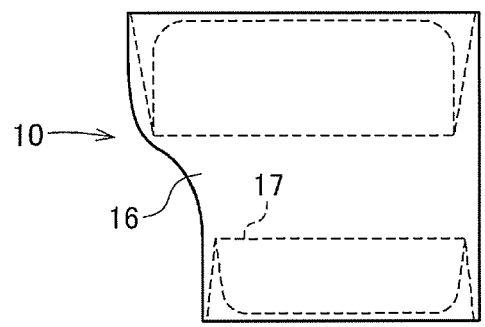
FIG. 22a is a plan view showing how to fold a side airbag.
Figure 22B:
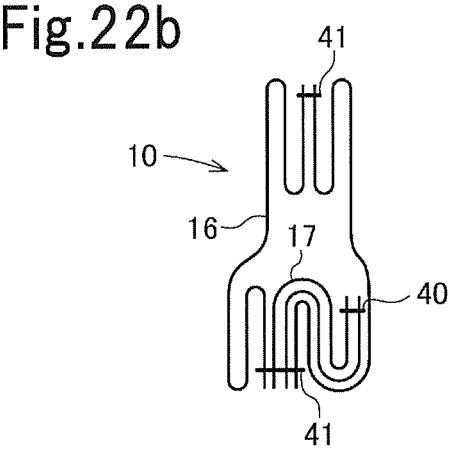
Figure 23A:
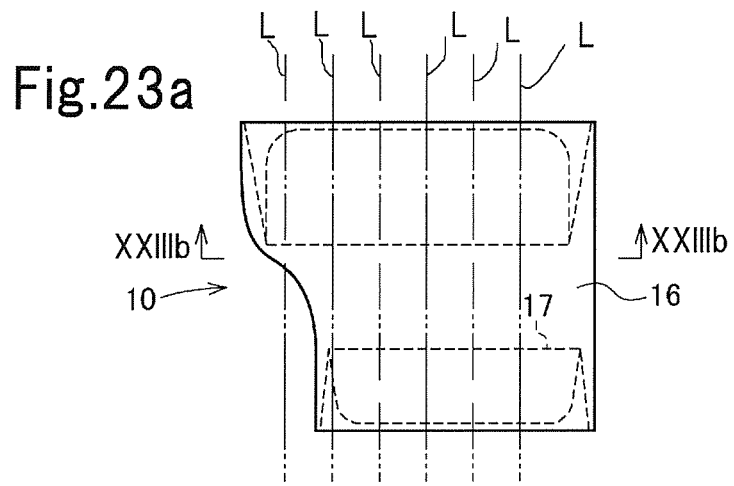
FIG. 23a is a plan view showing how to fold a side airbag.
Figure 23B:
Figure 24A:
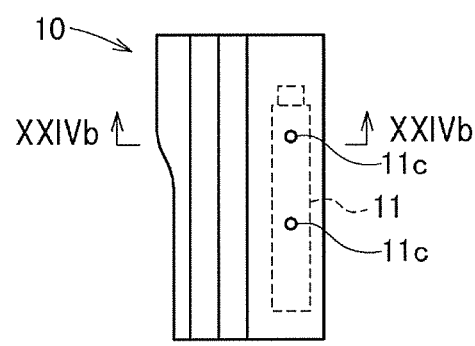
FIG. 24a is a plan view showing how to fold a side airbag.
Figure 24B:
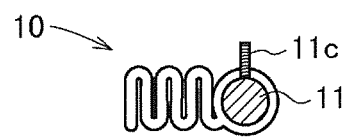

First, as shown in FIGS. 20a and 20b, the side airbag 10 is spread out flat. Then, as shown in FIGS. 21a and 21b, the lower edge part of the side airbag 10 is folded so as to be swallowed up into the side airbag 10, and the lower edge part of the side airbag 10 is thereby made linear. Next, as shown in FIGS. 22a and 22b, the upper edge part of the side airbag 10 is folded so as to be swallowed up into the side airbag 10, and the upper edge part of the side airbag 10 is thereby made linear. After that, as shown in FIG. 23a to FIG. 24b, the side airbag 10 is accordion-folded (folded in a zigzag manner). The folding lines L for this accordion-folding are in the vertical direction (the direction parallel to the longitudinal direction of the inflator 11). Thus, as shown in FIG. 24a and FIG. 24b, a generally rectangular parallelepiped-shaped folded body is formed.

When the side airbag folded in this manner is inflated, in the late stage of the inflating process, the folded parts in the upper part and lower part of the side airbag 10 inflate from the state of FIGS. 22a and 22b so as to protrude upward and downward. Since the direction of this protruding is about the same as the direction of the gas pressure acting on the folded parts in the upper part and lower part in the side airbag, the folded parts in the upper part and lower part of the side airbag 10 inflate smoothly upward and downward. That is, in the late stage of the inflating process of the side airbag 10, the upper part and lower part of the side airbag 10 inflate and deploy smoothly upward and downward along the door or the like of the vehicle.

Although embodiments of the present invention have been described in detail, it is obvious to those skilled in the art that various changes can be made without departing from the spirit and scope of the present invention.

The invention claimed is:

1. A side airbag device comprising: an airbag; and an inflator for inflating the airbag,
    the airbag including an outer bag and an inner bag inflating within the outer bag,
    the inner bag being provided with a communication opening connecting the inside of the outer bag and the inside of the inner bag,
    wherein the inflator is disposed in the airbag, and at least a gas jetting portion of the inflator is disposed in the inner bag in the vicinity of the communication opening,
    wherein the outer bag and the inner bag are each made by folding a panel in half such that the peripheries are superimposed, and the superimposed peripheries are sewn together,
    wherein the folded edge of the inner bag is disposed along the folded edge of the outer bag,
    wherein the communication opening is disposed in the vicinity of the folded edge of the inner bag,
    wherein the inflator is rod-like and is disposed along the folded edge of the inner bag,
    wherein the gas jetting portion is provided at one end in the longitudinal direction of the inflator,
    wherein a distributor for distributing gas from the gas jetting portion to the inside of the inner bag and the inside of the outer bag is provided at the one end of the inflator,
    wherein the inner bag is disposed in the lower part of the inside of the outer bag, and the folded edge is disposed on a vertical edge of the airbag,
    wherein a vertical edge other than the folded edge, and the lower edge of the inner bag are sewn together with the periphery of the outer bag; and
    wherein the inner bag and the outer bag are each provided with an opening through which a harness connected to the inflator is passed, and the passing opening of the inner bag and the passing opening of the outer bag are provided at positions such that they are not superimposed on each other.

2. The side airbag device according to claim 1, wherein the outer and inner bags are folded before inflation, and
    wherein when the outer and inner bags are folded, the airbag is spread out flat, the lower edge part of the airbag is folded so as to be swallowed up into the outer and inner bags, and the upper edge part of the outer bag is folded so as to be swallowed up into the outer and inner bags, and after that, the outer and inner bags are accordion-folded along folding lines in the vertical direction into a final folded shape.

3. A side airbag device comprising: an airbag; and an inflator for inflating the airbag, the airbag including an outer bag and an inner bag inflating within the outer bag, the inner bag being provided with a communication opening connecting the inside of the outer bag and the inside of the inner bag, wherein the inflator is disposed in the airbag, and at least a gas jetting portion of the inflator is disposed in the inner bag in the vicinity of the communication opening, wherein the outer bag and the inner bag are each made by folding a panel in half such that the peripheries are superimposed, and the superimposed peripheries are sewn together, wherein the folded edge of the inner bag is disposed along the folded edge of the outer bag, wherein the communication opening is disposed in the vicinity of the folded edge of the inner bag, wherein the inflator is rod-like and is disposed along the folded edge of the inner bag, wherein the gas jetting portion is provided at one end in the longitudinal direction of the inflator, wherein a distributor for distributing gas from the gas jetting portion to the inside of the inner bag and the inside of the outer bag is provided at the one end of the inflator, wherein the distributor has a hollow cylinder portion, an inward flange-like portion provided at one end face of the hollow cylinder portion, and a gas discharge hole formed inside the flange-like portion, wherein the gas jetting portion of the inflator is inserted into the hollow cylinder portion from the other end of the hollow cylinder portion, wherein the distributor is disposed, in the inner bag, in the immediate vicinity of the communication opening such that the gas discharge hole faces the communication opening, and wherein when the inflator jets gas, part of the gas from the gas jetting portion flows through the gas discharge hole toward the communication opening and flows through the communication opening into the outer bag, and the other part flows into the inner bag through the gap between the other end of the hollow cylinder portion and the inflator.

4. A side airbag device comprising: an airbag; and an inflator for inflating the airbag, the airbag including an outer bag and an inner bag inflating within the outer bag, the inner bag being provided with a communication opening connecting the inside of the outer bag and the inside of the inner bag, wherein the inflator is disposed in the airbag, and at least a gas jetting portion of the inflator is disposed in the inner bag in the vicinity of the communication opening, and wherein the inner bag and the outer bag are each provided with an opening through which a harness connected to the inflator is passed, and the passing opening of the inner bag and the passing opening of the outer bag are provided at positions such that they are not superimposed on each other.

* * * * *